(12) United States Patent
Zhang et al.

(10) Patent No.: US 12,386,443 B2
(45) Date of Patent: Aug. 12, 2025

(54) ELECTRODE STRUCTURE AND DEVICE INCLUDING THE SAME

(71) Applicant: TPK Advanced Solutions Inc., Fujian (CN)

(72) Inventors: Jian Zhang, Xiamen (CN); Si Qiang Xu, Xiamen (CN); Mei Fen Bai, Quanzhou (CN); Wei Chuan Chao, New Taipei (TW); Jun Hua Huang, Qingliu County (CN); Song Xin Wang, Xiamen (CN); Feng Ming Xue, Zhenlai County (CN); Long Yun Zhan, Jilin (CN); Jin Shou Huang, Dejua County (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 18/770,922

(22) Filed: Jul. 12, 2024

(65) Prior Publication Data

US 2024/0370109 A1  Nov. 7, 2024

Related U.S. Application Data

(63) Continuation of application No. 18/093,550, filed on Jan. 5, 2023, now abandoned.

(51) Int. Cl.
 *G06F 3/041* (2006.01)

(52) U.S. Cl.
 CPC .... *G06F 3/041* (2013.01); *G06F 2203/04102* (2013.01)

(58) Field of Classification Search
 CPC ............... G06F 3/041; G06F 2203/04102
 See application file for complete search history.

(56) References Cited

U.S. PATENT DOCUMENTS

| | | | | |
|---|---|---|---|---|
| 2012/0162099 A1* | 6/2012 | Yoo | .................... | G06F 3/0443 345/173 |
| 2015/0359105 A1* | 12/2015 | Yoon | ................ | C09D 129/04 174/268 |
| 2019/0339741 A1* | 11/2019 | Park | .................... | G09F 9/301 |

\* cited by examiner

*Primary Examiner* — Temesghen Ghebretinsae
*Assistant Examiner* — Sosina Abebe
(74) *Attorney, Agent, or Firm* — Cooper Legal Group, LLC (57) ABSTRACT

An electrode structure includes a substrate and a silver nanowire electrode disposed on the substrate. The electrode structure can be changed from an expanded state to a bent state with a bending radius of about 2-4 mm. The electrode structure includes a bending region and a first non-bending region and a second non-bending region respectively adjacent to the bending region in the bent state. The silver nanowire electrode has a change rate of a resistance value between the bent state and the expanded state of less than 10% in an electrode section of the bending region.

20 Claims, 6 Drawing Sheets

ELECTRODE STRUCTURE AND DEVICE INCLUDING THE SAME

CROSS-REFERENCE TO RELATED APPLICATION

The instant application is a continuation of U.S. patent application Ser. No. 18/093,550, filed Jan. 5, 2023, which is incorporated herein by reference.

BACKGROUND OF THE DISCLOSURE

1. Field of the Disclosure

The present disclosure relates to an electrode structure and a device including the electrode structure, and more particularly, to an electrode structure, in which the change rate/ratio of the resistance value in a bent section is controlled, and a device including the electrode structure.

2. The Prior Arts

In recent years, flexible applications have gradually become a standard specification for electronic products. Compared with a fixed-shape display device, a flexible display device can be folded, rolled, or bent to change a shape of the flexible display device in a collapsed state, so it is easy to carry and the user's convenience is improved.

For evaluating the reliability of the flexible device in customer use, dynamic bending tests are generally adopted. For example, Taiwan Patent Publication No. TW202221400 (hereinafter referred to as TW400) discloses a touch panel including a silver nanowire (SNW) electrode and peripheral metal traces, wherein a dynamic bending test (for example, 200K times) on the peripheral metal traces are performed under a specific curvature radius, then the change in overall resistance value of the peripheral metal traces is measured. However, the change in resistance of the SNW electrode in the bending region is not measured in TW400. In addition, U.S. Pat. No. 11,343,911 (hereinafter referred to as US911) discloses a fix bent device, wherein a transparent conductive electrode is firstly bent and then fixed in its bent state. US911 has disclosed the change in resistance value of the transparent conductive electrode before and after bending. However, the resistance value is measured for the entire length of electrode in US911. For example, as shown in FIG. 6 of US911, the contacts for measuring are disposed at both ends of the entire length of electrode of 5 cm so as to measure the change in resistance value of the entire length of electrode before and after bending. In other words, the measurement specific for the change of electrode resistance value in the bending region is still not performed. The reason thereof is that US911 is a fix bent structure but not a flexible device, users cannot switch the fix bent structure between folded and unfolded states, so the difference (or change) in resistance value of the bending region in both states of use is not a concern for US911.

The flexible device can be roughly divided into outward foldable and inward foldable types. For the outward foldable device, the user can view and touch the screen in the folded state. When the user intends to touch the screen located in the bending region, whether the system can perform touch sensing normally will have a profound impact on the user experience. On the other hand, the user may switch the device from the unfolded state to the folded state and perform touching on the screen (such as handwriting, gesture sliding, etc.) at the same time. If a touch is not sensed correctly or is sensed in an unprecise timing when the finger slides to the folding region, it will also result in poor experience. As described above, the touch performance in the folding region is a very important part of the user experience, whether it is possible to prevent the resistance value of the touch electrode in the section of the folding region from generating an obviously excessive change rate of the resistance value due to folding plays a key role. Although US911 is not a flexible device, referring to disclosed resistance data of US911, it can be calculated that the change rate of the resistance value of US911 in the bending region exceeds 100%. That is, in the prior art, there are problems such as delay and poor sensing when touching by the user due to the high change rate of the resistance value in the bending region.

Hence, the present disclosure has been developed in view of the above-mentioned disadvantages.

SUMMARY OF THE DISCLOSURE

An objective of the present disclosure is to provide an electrode structure, which has a change rate of a resistance value of less than 10% in a bent section in a bent state. Therefore, it has an excellent balance between electrical conductivity and optical properties.

The electrode structure of the present disclosure comprises: a substrate; and a silver nanowire electrode disposed on the substrate; wherein the electrode structure can be changed from an expanded state to a bent state with a bending radius of about 2-4 mm, the electrode structure includes a bending region and a first non-bending region and a second non-bending region respectively adjacent to the bending region in the bent state, the silver nanowire electrode has a change rate of a resistance value between the bent state and the expanded state of less than 10% in an electrode section of the silver nanowire electrode in the bending region.

Preferably, according to the electrode structure of the present disclosure, the silver nanowire electrode includes silver nanowires and a resin.

Preferably, according to the electrode structure of the present disclosure, the electrode structure can be changed from the expanded state to the bent state with the bending radius of about 3 mm, and the change rate of the resistance value between the bent state and the expanded state of the silver nanowire electrode is about 2.8%-7.2% in the electrode section of the bending region; alternatively, the electrode structure can be changed from the expanded state to the bent state with the bending radius of about 2-4 mm, and the change rate of the resistance value between the bent state and the expanded state of the silver nanowire electrode is about 2.4%-7.2% in the electrode section of the bending region.

Preferably, according to the electrode structure of the present disclosure, the electrode structure can be changed from the expanded state to the bent state with the bending radius of about 3 mm, and the change rate of the resistance value between the bent state and the expanded state of the silver nanowire electrode is about 2%-8% in the electrode section of the bending region; alternatively, the electrode structure can be changed from the expanded state to the bent state with the bending radius of about 2-4 mm, and the change rate of the resistance value between the bent state and the expanded state of the silver nanowire electrode is about 2%-8% in the electrode section of the bending region.

Preferably, according to the electrode structure of the present disclosure, the silver nanowire electrode includes a first electrode and a second electrode, wherein the first electrode and the second electrode are disposed on different sides of the substrate, the first electrode has a change rate of a first resistance value between the bent state and the expanded state, the second electrode has a change rate of a second resistance value between the bent state and the expanded state, and the change rate of the first resistance value is different from the change rate of the second resistance value.

Preferably, according to the electrode structure of the present disclosure, the silver nanowire electrode includes a first electrode and a second electrode, wherein the first electrode and the second electrode are disposed on different sides of the substrate, and the second electrode is closer to a bending axis than the first electrode, the first electrode has a change rate of a first resistance value between the bent state and the expanded state, the second electrode has a change rate of a second resistance value between the bent state and the expanded state, and the change rate of the second resistance value is larger than the change rate of the first resistance value.

Preferably, according to the electrode structure of the present disclosure, the silver nanowire electrode includes a first electrode and a second electrode, wherein the first electrode and the second electrode are disposed on different sides of the substrate, and the second electrode is closer to a bending axis than the first electrode, the first electrode has a change rate of a first resistance value between the bent state with a bending radius of about 3 mm and the expanded state, the second electrode has a change rate of a second resistance value between the bent state with a bending radius of about 3 mm and the expanded state, the change rate of the second resistance value is about 1.1-2.5 times or 1.2-1.8 times the change rate of the first resistance value, and both the change rates of the second resistance value and the first resistance value are less than 10%.

Preferably, according to the electrode structure of the present disclosure, the silver nanowire electrode is made of a silver nanowire paste with a sheet resistance of 15-100 ops, and the silver nanowire electrode has a thickness of less than 50 nm. The silver nanowire electrode is made of a silver nanowire paste with a sheet resistance of 30-70 ops, and the silver nanowire electrode has a thickness of less than 50 nm.

In addition, the present disclosure further provides a device, such as a display device, which comprises the above-mentioned electrode structure. The device is a flexible display device including a display element, an optical adhesive layer is disposed between the display element and the electrode structure, and the display element displays an image correspondingly to the bending region and the first non-bending region and the second non-bending region.

Preferably, according to the device of the present disclosure, an average slope of a storage modulus of the optical adhesive layer ranges from −4.0 kPa/° C. to −1.5 kPa/° C. in a temperature range of −30° C. to 60° C.

As described above, the electrode structure provided by the present disclosure allows users to have a good touch experience when operating in a bent state; meanwhile, the electrical and optical properties (such as transmittance and haze) of the electrode structure provided by the present disclosure in a bent state all fall within the range of the product specification.

In order to support the understanding of those skilled in the art in terms of the purpose, features, and effects of the present disclosure, the following specific embodiments and the accompanying drawings are provided to describe the present disclosure in detail.

BRIEF DESCRIPTION OF THE DRAWINGS

The present disclosure will be apparent to those skilled in the art by reading the following detailed description of a preferred embodiment thereof, with reference to the attached drawings, in which.

DETAILED DESCRIPTION OF THE PREFERRED EMBODIMENT

Hereinafter, the advantages, features, and achieving methods of the present disclosure will be apparent by the following detailed description of exemplary embodiments of the present disclosure thereof, with reference to the accompanying drawings. It should be noted, however, that the present disclosure is not limited to the following exemplary embodiments, but may be implemented in various forms.

The terminology used herein is used to describe particular embodiments only but is not intended to limit the present disclosure. As used herein, the singular expression "a" and "the" also includes the plural expression unless it is clearly indicated otherwise in the context.

In addition, it should be understood that spatial terms such as "beneath", "below", "under", "lower", "above", "upper", "over", "left side", "right side", "side", etc. can be used herein corresponding to the spatial relationship in the drawings for describing the relationship between one element and another element(s) as shown in the drawings. Spatial terms herein may encompass different orientations of the equipment/device/element in use, operation and/or manufacture in addition to the orientation depicted in the drawings. For example, if the equipment/device/element in the drawings is turned over, elements described as "below" or "beneath" other elements or features would then be oriented "above" the other elements or features accordingly. Therefore, the term "below" described herein may include both above and below orientations depending on the spatial relationship of the equipment/device/element. In addition, the equipment/device/element may be oriented otherwise (e.g., rotated by 45 degrees, 90 degrees, or in other orientations), that is, the spatial relative terms used herein should be interpreted accordingly. In addition, unless explicitly described, the values referenced herein, such as thickness, width, wire diameter, wire length, etc., are not fixed values but can be regarded as approximate values, i.e., contain a margin of error or range as expressed by "about", "approximately", or "substantially". Those skilled in the art can understand, the values referenced herein, such as thickness, width, wire diameter, wire length, etc., may contain manufacturing tolerances, measurement errors, etc. The margin of error or range of the values referred herein may be ±20%, ±10%, or ±5%.

It should also be understood that, although the terms such as "first" and "second" may be used herein to describe various elements, these elements should not be limited by these terms. These terms are used to distinguish respective elements only. Therefore, a first element referred in some embodiments could be referred as a second element in other embodiments without departing from the teachings of the present disclosure. In the present specification, the same reference numerals denote the same elements.

Figure 1:
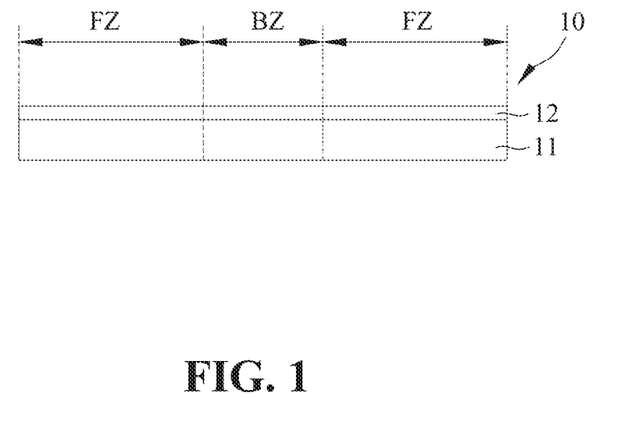
FIG. 1 is a schematic diagram illustrating an electrode structure according to an embodiment of the present disclosure.
Figure 2:
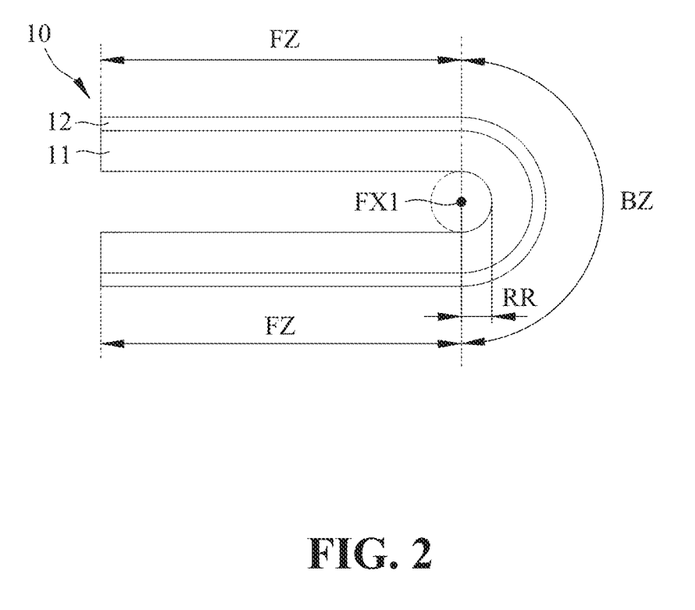
FIG. 2 is a cross-sectional view illustrating the electrode structure of FIG. 1 in a bent state.
Figure 3:
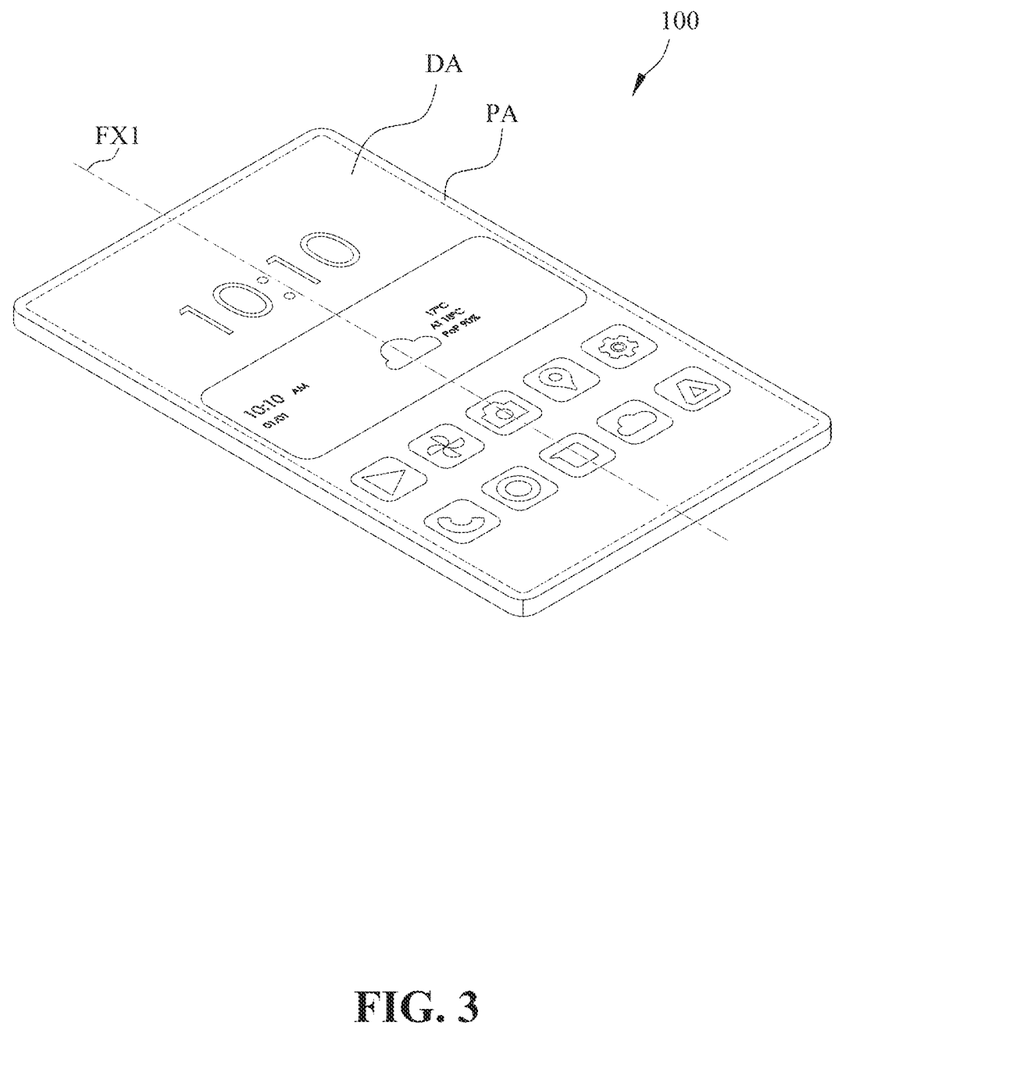
FIG. 3 is a perspective view illustrating a touch display device according to the present disclosure.
Figure 4:
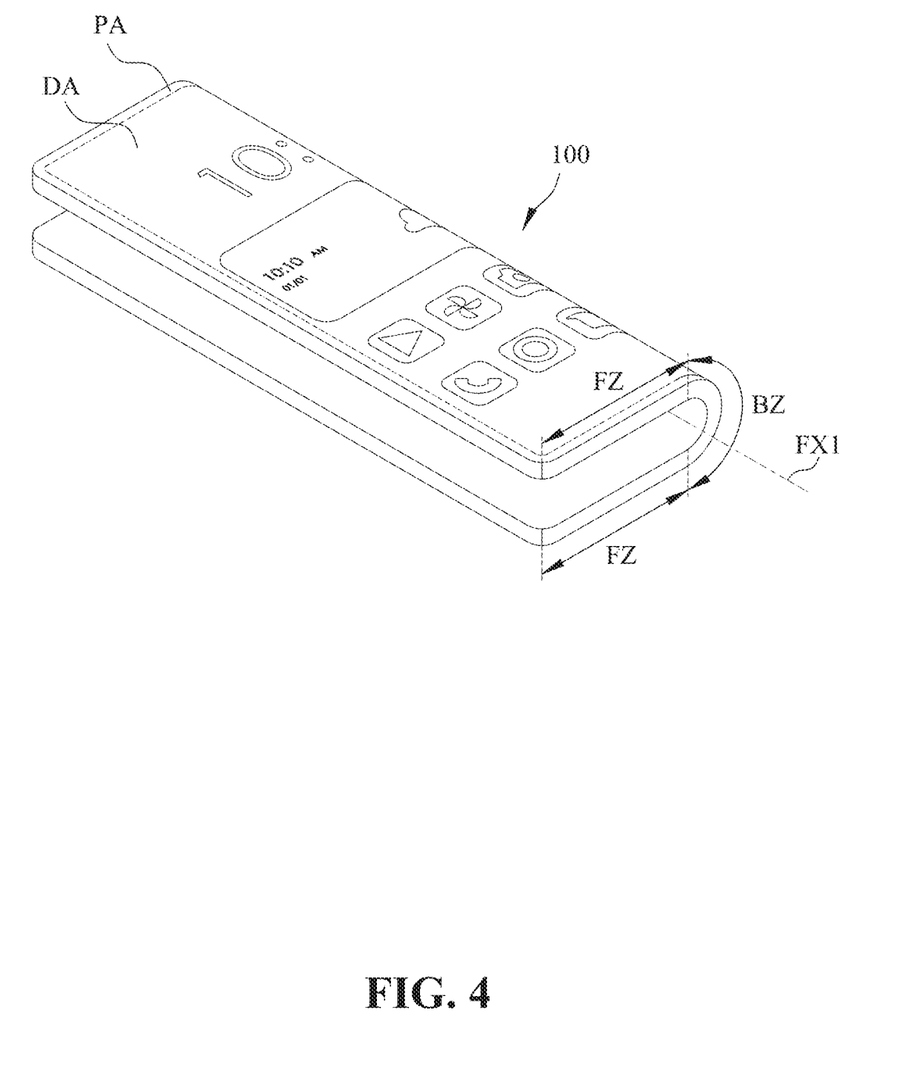
FIG. 4 is a perspective view illustrating the touch display device of FIG. 3 in a bent state.

Refer to FIGS. 1 and 2, wherein FIG. 1 is a schematic diagram illustrating an electrode structure according to the present disclosure, which is an electrode structure for inductive touch; and FIG. 2 is a cross-sectional view illustrating the electrode structure of FIG. 1 in a bent state. Referring to FIG. 1, an electrode structure 10 includes an electrode 12 and a substrate 11 which may be used to support the electrode 12. In one embodiment, the electrode structure 10 can constitute a touch display device 100 together with a transparent cover plate, a display module, an optical film, an optical adhesive, etc. (which are not depicted in FIG. 1), while the touch display device 100 can be a bendable, foldable, or other flexible display device (flexible display) for similar application, as shown in FIGS. 3 and 4.

In this embodiment, the touch display device 100 includes a bending region BZ, however, the disclosure is not be limited thereto. According to another embodiment of the present disclosure, the touch display device 100 may include a plurality of folding regions. The touch display device 100 may include a display area DA and peripheral areas PA located beside the display area DA, while the electrode structure 10 of the embodiment of the present disclosure substantially corresponds to the display area DA, so as to facilitate the user to view the display screen and perform touch operations.

For the purpose of simplicity, only the electrode structure is depicted in FIGS. 1 and 2. Referring to FIG. 2, the electrode structure 10 of the embodiment of the present disclosure includes a bending region BZ, that is, the electrode 12 and the substrate 11 can be bent and inversely folded in the bending region BZ. As shown in FIG. 2, the electrode structure 10 may be folded along an axis FX1 extending in a predetermined direction, while in the embodiment of the present disclosure, a bending radius RR is defined as the distance from the projection position of the axis FX1 in the vertical direction to the lower surface of the substrate 11. Herein, this state of being folded may be referred to as a "folded state" or a "bent state". FIG. 1 shows the aspect where the electrode structure 10 is expanded, that is, the state of being unbent may be referred to as "expanded state", "unfolded state", or "unbent state". In addition, FIG. 1 shows that the electrode structure 10 includes one bending region BZ, but the present disclosure is not limited thereto, that is, the electrode structure 10 may include a plurality of bending regions BZ. The electrode structure 10 of the embodiment of the present disclosure may be defined into a plurality of regions according to the operation mode of the electronic product, for example, the electrode structure 10 may include at least one of a bending region BZ or a non-bending region FZ. As shown in FIG. 1, the bending region BZ may be defined between two non-bending regions FZ. In other embodiments, the touch display device may include a bending region BZ and a non-bending region FZ.

In another embodiment, the electrode structure 10 of the present disclosure can constitute a touch display device together with a transparent cover plate, a display module, an optical film, an optical adhesive, etc. (which are not depicted in FIG. 1), while the touch display device can be a rollable touch display device. When the device is rolled, the entire display device forms a single bending region BZ.

In some embodiments, the substrate 11 can be, but not limited to, a glass substrate (such as a bendable ultra-thin glass substrate), a polyethylene terephthalate (PET) substrate, a cyclic olefin polymer (COP) substrate, a transparent polyimide (CPI) substrate, a polyethylene naphthalate (PEN) substrate, a polycarbonate (PC) substrate, a polyether sulfide (PES) substrate, etc. In addition, the substrate 11 can have the function of carrying electrodes and can also provide optical functions according to requirements. For example, the substrate 11 can be a phase retardation film (i.e., a ½ wavelength retardation film or a ¼ wavelength retardation film), a compensation film, a polarizing film, an anti-glare film, an anti-reflection film, or a combination thereof, or other functional film, such as a protective film, an anti-scratch film, an anti-fouling film, or a combination thereof, or a composite film with the above functions. Specifically, referring to FIG. 1, the electrode 12 is disposed on the substrate 11. In some embodiments, the electrode 12 includes a touch electrode layer disposed on the substrate 11. According to some embodiments, the touch electrode layer can be formed of a transparent conductive material, including materials selected from metal oxides such as indium tin oxide (ITO); or metal mesh, silver nanowire (SNW), carbon nanotube (CNT), graphene; or conductive polymers such as poly(3,4-ethylenedioxythiophene) (PEDOT), etc. Particularly, the touch electrode layer can be formed of one or more of these materials.

More particularly, in one embodiment, the electrode 12 is made of silver nanowires, and the method thereof may be directly or indirectly coating a dispersion/ink containing silver nanowires on the substrate 11. For example, the silver nanowires are mixed into a solvent such as water, alcohol, ketone, ether, hydrocarbon, or aromatic solvent (benzene, toluene, xylene, etc.) to form a coating material/paste/ink. Said coating material/paste/ink may also contain additives, surfactants, or binders such as carboxymethyl cellulose (CMC), 2-hydroxyethyl cellulose (HEC), hydroxypropyl methyl cellulose (HPMC), sulfonic acid ester, sulfuric acid ester, disulfonate, sulfosuccinic acid ester, phosphoric acid ester, or fluorine-containing surfactant, etc.

In more detail, the phrase "metal nanowires" used herein is a collective term, which refers to a collection of metal wires including a plurality of element metals, metal alloys or metal compounds (including metal oxides), and the number of metal nanowires included therein does not affect the claimed scope of the present disclosure. In addition, the size of at least one cross-section (i.e., the diameter of the cross-section) of a single metal nanowire is less than about 500 nm, preferably less than about 100 nm, and more preferably less than about 50 nm. The metal nanostructure referred to as "wire" in the present disclosure mainly has a high aspect ratio, for example, between about 10 and 100,000. In more detail, the aspect ratio (the ratio of wire length to diameter of the cross-section) of the metal nanowire can be larger than about 10, preferably larger than about 50, and more preferably larger than about 100. The metal nanowire can be any metal, including (but not limited to) silver, gold, copper, nickel, and gold-plated silver. If other terms, such as silk, fiber, tube, etc., also have the size and the high aspect ratio mentioned above, they are also within the scope encompassed by the present disclosure. Considering that the parameters of the silver nanowires contained in the dispersion used for coating are not exactly the same, for example, silver nanowires of the same specification but produced in different production batches may be different in average diameter (i.e., wire diameter), standard deviation of diameter, maximum/minimum diameter, distribution of diameter, etc., or different in average wire length, standard deviation of wire length, maximum/minimum wire length, distribution of wire length, etc. Regarding the distribution of metal nanowires, reference may be made to US20110174190, which is incorporated in the entirety of the embodiments of the present disclosure. Therefore, in order to avoid the electrodes made of the silver nanowire paste of the same specification from having different changes in resistance value in the bending region, in the embodiments of the present disclosure, the different changes in resistance value of the electrodes in the bending region are required to be limited to less than about 15%, 12%, 10%, and 8% according to the standards of mass production and product acceptance criterion.

In a preferred embodiment, the shape of the nanostructure is anisotropic (i.e., the aspect ratio≠1). Anisotropic nanostructures typically have a longitudinal axis along their length. Exemplary anisotropic nanostructures can include nanowires, i.e., solid nanowire structures having an aspect ratio (the ratio of wire length to wire diameter) of at least 10, and more typically at least 50. In addition, a population of nanowires of specific specification (for example, synthesized and purified products, or coating material/paste formed by mixing with solvent) do not have a single size, but include nanostructures within a certain size range (wire length, wire diameter, and so on). Therefore, the specifications (such as optical properties, electrical properties, or flexible properties after being stressed) of the thin film formed by such population of nanowires depend on the common effect of the entire population of nanowires.

After the coating is completed, the silver nanowire layer is then formed by a curing step. This silver nanowire layer can then be used to form the electrode 12 through a patterning method well-known in the art (for example, through a photolithography process utilizing photoresist as well as an etching process utilizing laser or etching solution, and so on).

Preferably, in one embodiment, a polymer layer may be further disposed for covering the silver nanowire layer, so the polymer layer can be referred to as an overcoat (OC). In one embodiment, a suitable polymer is coated on the silver nanowire layer, and the polymer with flowing state/fluidity can infiltrate between the silver nanowires as a filler, so the polymer layer can also be referred to as a matrix layer, while the silver nanowires will be embedded into the polymer, thereby forming a silver wires/resin composite structure after the polymer is cured. That is, in this step, a polymer layer is added on the silver nanowire layer by coating a polymer, while the silver nanowires are embedded in the polymer layer to form a composite structure. In some embodiments of the present disclosure, the polymer layer is formed of an insulating material. For example, the material of the polymer layer can be a non-conductive resin or other organic material, such as polyacrylate, epoxy resin, polyurethane, polysilane, silicone, poly(silicon-acrylic acid), polyethylene (PE), polypropylene (PP), polyvinyl butyral (PVB), polycarbonate (PC), acrylonitrile butadiene styrene (ABS), etc. In some embodiments of the present disclosure, the polymer layer may be formed by methods such as spin coating, spray coating, and printing. In some embodiments of the present disclosure, the polymer layer has a thickness of about 20 nm to 10 mm, or 50 nm to 200 nm, or 30 nm to 100 nm. For example, the thickness of the polymer layer may be about 90 nm or 100 nm. The above-mentioned specific methods can be referenced in, for example, US20190227650A, CN101292362, the whole context of which can be incorporated herein, and the silver nanowire paste and the polymer coating material are both obtained from Cambrios. Unless otherwise specified, the silver nanowire electrode referenced herein is the conductive layer of the silver wires/resin composite structure. In some embodiments, the silver nanowire electrode with a sheet resistance of 30 ops (Ω/square) may have a thickness of less than 50 nm, or a thickness of 10 nm to 50 nm, 20 nm to 40 nm, or 40 nm to 50 nm. Under this sheet resistance, if the thickness of the silver nanowire electrode is too large (for example, larger than 50 nm), the optical performance (for example, the value of yellowness b*) of the silver nanowire electrode may be difficult to meet the requirements, and the contact impedance between the silver nanowire electrode and the subsequently disposed material layer (for example, the leading wires in the peripheral area made of metal materials) may be higher; and if the thickness of the silver nanowire electrode is too small (for example, less than 10 nm), the anti-ultraviolet performance of the silver nanowire electrode may be insufficient.

Specifically, according to some embodiments, the electrode structure 10 may further include an isolation layer or protective layer. The isolation layer is disposed above the silver nanowire layer or the silver nanowires/resin composite structure layer. In the present disclosure, the term "isolation" encompasses both electrical isolation and physical isolation aspects. The isolation layer may be a single layer or a multi-layer stack of inorganic packaging materials, or a stack of inorganic and organic packaging materials. The inorganic packaging materials used are, for example, but not limited to, silicon nitride ($SiN_x$), silicon oxide ($SiO_x$), silicon oxynitride ($SiON_x$), aluminum oxide ($AlO_x$), or titanium oxide ($TiO_x$).

The specific process of the electrode structure according to the first embodiment of the present disclosure are as follows:

S1: providing a substrate 11, which is a PET substrate with a thickness of 50 μm obtained from Toray Company (product model number: U483).

S2: disposing a transparent conductive film. The silver nanowire paste (product model number: G6; sheet resistance: 30 ops (Ω/square); aspect ratio of nanowires:about 450-550) and the polymer coating material (product model number: OCHE) obtained from Cambrios are sequentially formed on the substrate 11 by means of roll-to-roll coating (i.e., slot-die coating), and cured to form a silver nanowire layer with a thickness of about 30 nm.

Figure 5:
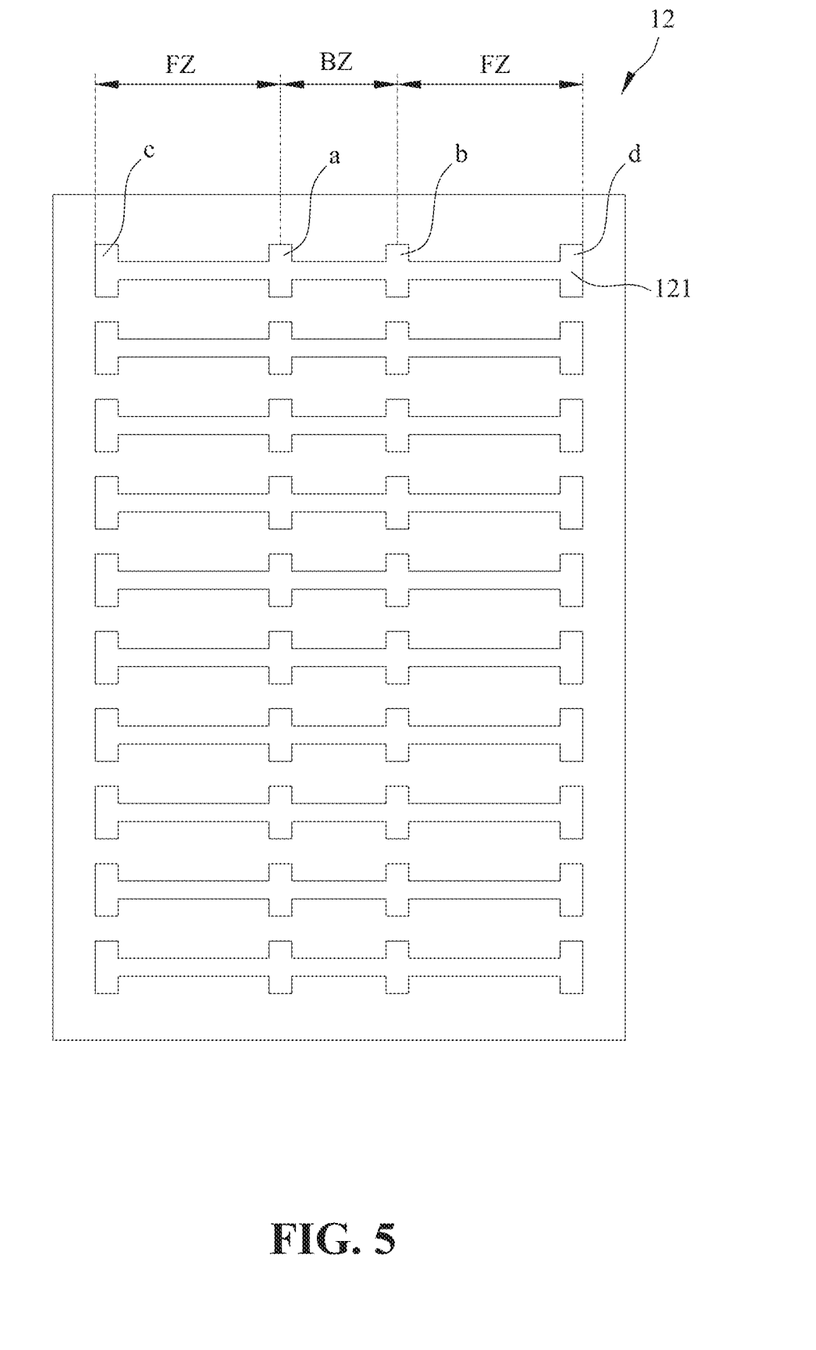
FIG. 5 is a schematic diagram illustrating the pattern of the electrode structure according to the present disclosure.

S3: forming touch electrodes. The silver nanowire layer is formed into electrodes with specific pattern (for example, the plurality of axial touch electrodes 121 shown in FIG. 5) by laser etching, thereby forming the electrode structure 10 of the embodiment of the present disclosure. In addition, the section a-b of the electrode in the bending region BZ is defined (i.e., point a is substantially located at the boundary/interface between the bending region BZ and the left non-bending region FZ; point b is substantially located at the boundary/interface between the bending region BZ and the right non-bending region FZ in FIG. 5), while point c and point d are two ends of the entire length of axial touch electrode 121; wherein the length of the section c-d is about 10 mm, the length of the section a-b is about 1 mm, and the width of each axial touch electrode 121 is about 10 μm.

S4: measuring the change in the resistance value (line resistance) of the section a-b of the touch electrode 121 in the bent state. Firstly, contacts are disposed at the positions of point a and point b of the touch electrode, respectively. For example, the conductive silver paste is applied at the positions of point a and point b. Afterwards, the probe of the resistance value measuring equipment can be connected to the cured conductive silver paste, and the resistance value of the section a-b can be measured. Accordingly, the resistance values of the section a-b and the section c-d are measured respectively in the bent state (wherein the electrode structure 10 of the embodiment of the present disclosure is inversely folded by 180 degrees under the condition that the bending radius is 3 mm, as depicted in FIG. 2) and the unbent state.

The specific process of the electrode structure according to a second embodiment of the present disclosure is the same as the first embodiment with silver nanowire ink having the same specification. However, the silver nanowire ink is produced in different batches from the silver nanowire ink used in the first embodiment of the present disclosure.

The specific process of the electrode structure according to a third embodiment of the present disclosure is the same as the first embodiment, except that a silver nanowire paste with a different product specification is used. In this embodiment, a silver nanowire paste with a product model number of G6 having a sheet resistance of 70 ops obtained from Cambrios is used. The cured silver nanowire layer has a thickness of about 40-50 nm.

The specific process of the electrode structure according to a fourth embodiment of the present disclosure is the same as the third embodiment, except that the condition of the bent state is changed to inversely folding by 180 degrees under a bending radius of 2 mm.

The specific process of the electrode structure according to a fifth embodiment of the present disclosure is the same as the third embodiment, except that the condition of the bent state is changed to inversely folding by 180 degrees under a bending radius of 4 mm.

The specific process of the electrode structure according to a sixth embodiment of the present disclosure is the same as the first embodiment, except that the substrate 11 is replaced by a PET substrate (product model number: U483) with a thickness of 125 μm obtained from Toray Company.

The specific process of the electrode structure according to a seventh embodiment of the present disclosure is the same as the first embodiment, except that the substrate 11 is replaced by the PET substrate (product model number: U483) with a thickness of 125 μm obtained from Toray Company; meanwhile, a silver nanowire paste with a different product specification is used. In this embodiment, a silver nanowire paste with a product model number of G5 having a sheet resistance of 30 ops, and an silver nanowire aspect ratio of about 400-750 obtained from Cambrios is used.

According to the embodiment of the present disclosure, since the resistance value of the touch electrode changes in the section a-b of the bending region BZ, for computing elements (such as touch chips), excessive change in resistance value will cause delay in signal transmission, resulting in low touch report rate or unprecise touch sensing. In one embodiment, when the touch electrode is applied to an outward foldable electronic product (that is, in the folded state, the user can still view and touch the display screen), if the change in resistance value of the touch electrode generated in the section a-b of the bending region BZ exceeds the specification of the computing elements (for example, larger than 15%, 12%, or 10%), the above problems will occur. Accordingly, the embodiments of the present disclosure can meet the specifications of computing elements (for example, the change in resistance value of the touch electrode in the section a-b of the bending region BZ can be less than 15%, 12%, 10%, and 8%), so as to satisfy the use of the outward foldable electronic products. Table 1 below shows the results of the touch sensing simulation performed on the electrodes fabricated in the foregoing embodiments, wherein a phenomenon of poor touch sensing occurs in the electrode of the second embodiment. Although the change rates of the resistance value presented in Table 1 are all positive numbers, the present disclosure does not exclude the aspect that the change rates of the resistance value are negative numbers. In other words, as long as the absolute value of the change rate of the resistance value meet the requirement listed herein, it belongs to the scope of the present disclosure. The formula of change rate or change ratio is (resistance (a-b) in bent state−resistance (a-b) in normal state)/resistance (a-b) in normal state.

TABLE 1

|  | Change rate of resistance value (%) | Touch Sensing Simulation |
| --- | --- | --- |
| First embodiment | 4.2 | ○ |
| Second embodiment | 11.7 | Δ |
| Third embodiment | 2.8 | ○ |
| Fourth embodiment | 3.1 | ○ |
| Fifth embodiment | 2.4 | ○ |
| Sixth embodiment | 7.2 | ○ |
| Seventh embodiment | 6.9 | ○ |

Referring to the first and second embodiments, it is found that the electrodes made of the silver nanowires of the same specifications but of different batches will have different changes in resistance value after bending. In the touch sensing simulation report, a problem of delayed touch-sensing reporting (represented by "Δ" in Table 1) occurred on the electrode of the second embodiment. As mentioned above, although the common performance of each batch of silver nanowire paste is consistent, there are still differences in the specifications of individual silver wires between batches. Therefore, the specifications are defined according to the characteristics of the electrodes to ensure the inspection compliance of end products.

Referring to the first and third embodiments, the use of silver nanowire paste with high sheet resistance will achieve a smaller change rate of the resistance value (%). The reason thereof can be understood as that the silver nanowire paste with high sheet resistance will form electrodes with higher resistance value after coating, so the changes in resistance value caused by the electrode in the bending region will not lead to a large change rate of the resistance value (%). However, according to the view point of signal transmission, electrodes with high resistance values are not preferred. Accordingly, although the silver nanowire paste with high sheet resistance helps to achieve a smaller change rate of the resistance value (%), considering the signal transmission of the entire electrode, in the embodiment of the present disclosure, it is recommended to use a silver nanowire paste with a sheet resistance less than 100 ops, preferably less than 85 ops, or less than 70 ops.

Also, taking the first and third embodiments for analyzing, the use of a silver nanowire paste with a low sheet resistance may lead to a higher change rate of the resistance value (%); and considering the view point of optics, a silver nanowire paste with a low sheet resistance may also cause poor optical properties (such as increased haze) because it contains more silver nanowire components. Therefore, in the embodiment of the present disclosure, it is recommended to use a silver nanowire paste with a sheet resistance larger than 15 ops, preferably larger than 20 ops, or larger than 30 ops. In summary, in order to make the changes in resistance value of the touch electrode in the section a-b of the bending region BZ not exceed the specification of the computing elements and also have good optical properties (such as a haze of less than 1) and signal transmission characteristics, a silver nanowire paste with a sheet resistance of 15-100 ops, 20-85 ops, or 30-70 ops can be used. In the first embodiment, the conductive film made of a silver nanowire paste of 30 ops has a haze of 0.4-0.6; in the third embodiment, the conductive film made of a silver nanowire paste of 70 ops has a haze of 0.25-0.3. The conductive film of the embodiment is made of a silver nanowire paste of 30-70 ops and has a haze of 0.25-0.6.

Referring to the first and sixth embodiments, when a thicker substrate is adopted, it can be understood that the silver nanowire electrode will have a larger strain in the bending region. According to the mechanical simulation system, the strains of the electrodes of the first and sixth embodiments are respectively 0.56% and 1.91% in the bending region. That is, the adopting of a thicker substrate will cause larger strain of the electrode in the bending region, thereby resulting in a larger change rate of the resistance value in the bending region. If considering that the strain is directly proportional to the change rate of the resistance value of the electrode in the bending region, it can be expected that when the strain is larger than 2.76%, the adopting of the silver wires of the first embodiment may make the change rate of the resistance value of the electrode in the bending region exceed 10%. On the other hand, when a thicker substrate is adopted, it can be known from the theory of mechanics that when the film layer is bent under stress, a tensile stress area and a compressive stress area will be formed, and a neutral axis/neutral surface with zero stress (which can be referenced in "Mechanics of Materials", James M. Gere et al.) will be formed between the two areas. Therefore, taking the first and sixth embodiments for explanation, if the substrate is thicker (i.e., the sixth embodiment), when the entire stack structure is bent under stress, the position of the electrode will be farther from the neutral axis (compared with the first embodiment). As a result, the stress/strain on the electrode of the sixth embodiment in the bending region is larger, thereby resulting in a larger change rate of the resistance value in the bending region. According to the view point of the above-mentioned neutral axis, when a thicker substrate is adopted, it can be considered to apply other film layers, such as protective layer, adhesive layer, optical film layer, etc., on the silver nanowire electrode, making the position of the neutral axis move upward, that is, making the silver nanowire electrode closer to the neutral axis, so as to reduce the stress/strain on the electrode in the bending region, thereby achieving a change rate of the resistance value not exceed 10%.

In addition, in the bent state, the change in resistance value of the section c-d will also affect the sensitivity of touch sensing, taking the first embodiment as example, the change in resistance value of the section c-d is about 1-5%. The formula of change rate or change ratio is (resistance (c-d) in bent state−resistance (c-d) in normal state)/resistance (c-d) in normal state.

Figure 6:
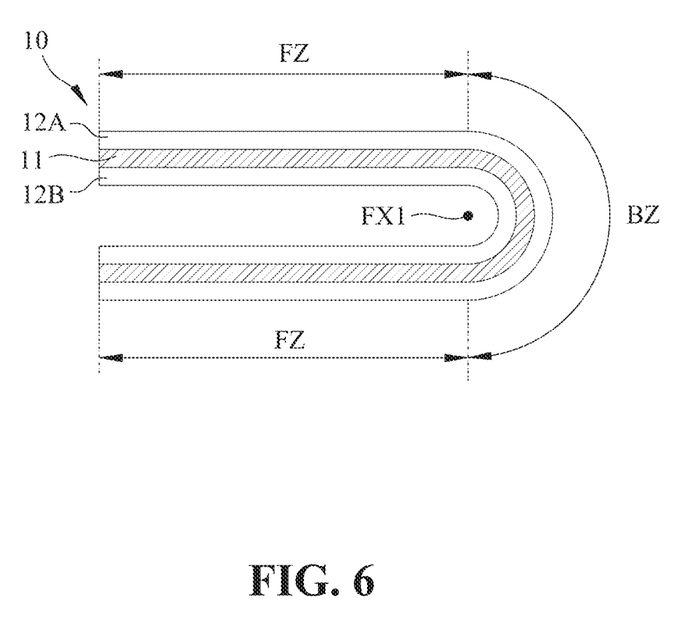
FIG. 6 is a cross-sectional view illustrating an electrode structure according to another embodiment of the present disclosure in a bent state.

In another embodiment of the electrode structure of the present disclosure, the touch electrodes are disposed at both sides (for example, the upper and lower sides) of the substrate 11. For example, as shown in FIG. 6, a second electrode 12B (such as a driving electrode) is disposed at the lower side of the substrate 11, a first electrode 12A (such as a sensing electrode) is disposed at the upper side of the substrate 11, and both the first electrode 12A and the second electrode 12B can be formed in the foregoing described manner. In the bent state, both the first electrode 12A and the second electrode 12B need to meet the requirement for the change rate of the resistance value of not exceeding 10%. On the other hand, since the distances from the first electrode 12A and the second electrode 12B to the axis FX1 are different, under the same bending condition, the strains on the first electrode 12A and the second electrode 12B are different. Therefore, it can be seen that the change rates of the resistance values of the first electrode 12A and the second electrode 12B are different under the same bending condition. In this embodiment, since the distance from the first electrode 12A to the axis FX1 is longer than the distance from the second electrode 12B to the axis FX1 (that is, the bending radius of the first electrode 12A is larger), the second electrode 12B is subject to larger stress. Therefore, the change rate of the resistance value of the second electrode 12B is larger than that of the first electrode 12A (but both meet the requirement of not exceeding 10%). Taking the first and sixth embodiments for analyzing, under the condition that the bending radius is 3 mm, the change rate of the resistance value of the second electrode 12B is about 1.1-2.5 times or 1.2-1.8 times that of the first electrode 12A.

In an eighth embodiment of the present disclosure, the electrode 12 is fabricated on a cyclic olefin copolymer (COP) substrate with a thickness of 25 μm obtained from KONICA MINOLTA, then laminated with a transparent polyimide thin film of 50 μm (Colorless PI, CPI) through an optical adhesive layer, and subjected to a bending test with a bending radius of 3 mm. In this embodiment, the CPI substrate is used for simulating a display element, such as an organic light emitting diode display (OLED). In this embodiment, the change rate of the resistance value of the electrode 12 complies with the aforementioned specification.

In addition, the storage modulus and bending test results are measured by dynamic load tests at different temperatures, wherein the average slope of the storage modulus of the optical adhesive layer (−30° C. to 60° C.) is between −4.0 kPa/° C. and −1.5 kPa/° C., so as to achieve sufficient stability (that is, the characteristics of the adhesive will not change greatly due to the change in temperature), and can also achieve good product reliability.

As shown in Table 2, various optical adhesive layers are tested in the embodiments of the present disclosure.

TABLE 2

| | Sample 1 | Sample 2 | Sample 3 | Sample 4 |
|---|---|---|---|---|
| Average slope of storage modulus (kPa/° C.) | −1.7 | −2.8 | −3.8 | −43.3 |

As can be seen from these embodiments, the larger absolute value of the average slope of the storage modulus (for example, the absolute value of the average slope of the storage modulus of Sample 4 is estimated to be 10 times that of the other 3 samples) indicates that the variability of the storage modulus at −30° C. to 60° C. is larger. Therefore, the storage modulus of Sample 4 at high temperature (such as 60° C.) is too small, and the material is softened rapidly in the temperature range, which has high fluidity (the material strength is small, and the cohesive force/crystallization force is very small), and is adverse to engineering applications. Specifically, the material strength of Sample 4 at high temperature (such as 60° C.) is adverse to the actual manufacturing process; while in the bent state, due to the low material strength of Sample 4, the stress may be concentrated on the electrode 12, thereby failing to meet the aforementioned requirement for the change rate of the resistance value (i.e., less than 12% or 10%).

Conversely, under the condition that the absolute value of the average slope of the storage modulus is too small, such as less than 1.5 (the absolute value of −1.5), although the variability of the storage modulus in the temperature range (−30° C. to 60° C.) is not large, the storage modulus of the material at high temperature is too large. Excessive large storage modulus means that the adhesive material is relatively hard and has a poor adhesion, thereby the phenomenon such as delamination/blister occurs under the bending test at high temperature. Moreover, the delamination/blister occurring during bending may cause the electrodes 12 to be damaged at the same time (that is, the aforementioned requirement for the change rate of the resistance value cannot be met), which will lead to the problem of poor product reliability.

In summary, in the embodiments of the present disclosure, an optical adhesive with an average slope of the storage modulus (−30° C. to 60° C.) between −4.0 kPa/° C. to −1.5 kPa/° C., or between −3.8 kPa/° C. to −1.7 kPa/° C., can be used to perform the adhesion for the components, such as a transparent cover plate, a display module, or an optical film, to constitute a touch display device. Meanwhile, the touch display device can meet the aforementioned requirement for the change rate of the resistance value when bending.

It can be understood that those skilled in the art can make various changes and modifications based on the above examples, which will not be listed one by one herein.

Finally, the technical features of the present disclosure and their achieved technical effects are summarized as follows:

1. According to the embodiments of the present disclosure, when the transparent electrode is in the bent state (wherein the bending condition is not limited), the change rate of the resistance value of the section located in the bending region is less than 10%, so that the user can have a good touch experience when operating in the bent state.

2. According to the embodiments of the present disclosure, when the transparent electrode is in the bent state (with a bending radius of about 2-4 mm, or about 2, 3 or 4 mm), the change rate of the resistance value of the section located in the bending region is 2%-8% or 2.4%-7.2%, meanwhile, the electrical and optical properties (such as transmittance and haze) of the transparent electrode all fall within the range of the product specification.

3. According to the embodiments of the present disclosure, when the transparent electrode is in the bent state with a bending radius of about 3 mm, the change rate of the resistance value of the section located in the bending region is 2%-8% or 2.8%-7.2%, meanwhile, the electrical and optical properties (such as transmittance and haze) of the transparent electrode all fall within the range of the product specification.

The implementations of the present disclosure have been described with reference to the specific embodiments above. Those skilled in the art can easily understand the technical features, advantages, and effects of the present disclosure from the present disclosure.

The above descriptions are only preferred embodiments of the present disclosure and are not intended to limit the scope of the present disclosure. Other equivalent changes and modifications made without departing from the spirit of the present disclosure should be included the appended claims.

What is claimed is:

1. An electrode structure, comprising:
   a substrate; and
   a sensing electrode disposed on the substrate;
   wherein the electrode structure is changed from an expanded state to a bent state with a bending radius of about 2-4 mm, the electrode structure comprises a bending region and a first non-bending region and a second non-bending region respectively adjacent to the bending region in the bent state, and a resistance value of an electrode section of the sensing electrode in the bending region has a first change rate between the bent state and the expanded state of less than 10%;
   wherein the sensing electrode comprises a first end in the first non-bending region and a second end in the second non-bending region, and a resistance value of a section between the first end and the second end of the sensing electrode has a second change rate between the bent state and the expanded state of about 1-5%;
   wherein the electrode structure is changed from the expanded state to the bent state with the bending radius of about 3 mm, and the first change rate between the bent state and the expanded state of the sensing electrode is about 2%-8%; or, the electrode structure is changed from the expanded state to the bent state with the bending radius of about 2-4 mm, and the first change rate between the bent state and the expanded state of the sensing electrode is about 2%-8%.

2. The electrode structure according to claim 1, wherein the sensing electrode comprises silver nanowires, metal oxides, or metal mesh.

3. The electrode structure according to claim 2, wherein the sensing electrode is made of silver nanowires embedded in a resin having a sheet resistance of 30-70 ops and a haze of 0.25-0.6, and the silver nanowires have an aspect ratio of about 400-750.

4. The electrode structure according to claim 1, wherein the electrode structure is changed from the expanded state to the bent state with the bending radius of about 3 mm, and the first change rate between the bent state and the expanded state of the sensing electrode is about 2.8%-7.2%; or, the electrode structure is changed from the expanded state to the bent state with the bending radius of about 2-4 mm, and the first change rate between the bent state and the expanded state of the sensing electrode is about 2.4%-7.2%.

5. The electrode structure according to claim 1, wherein the sensing electrode comprises a first electrode and a second electrode, the first electrode and the second electrode are disposed on different sides of the substrate, a resistance value of the first electrode has a third change rate between the bent state and the expanded state, a resistance value of the second electrode has a fourth change rate between the bent state and the expanded state, the third change rate is different from the fourth change rate, and both the third change rate and the fourth change rate are less than 10%.

6. The electrode structure according to claim 1, wherein the sensing electrode comprises a first electrode and a second electrode, the first electrode and the second electrode are disposed on different sides of the substrate, the second electrode is closer to a bending axis than the first electrode, a resistance value of the first electrode has a third change rate between the bent state and the expanded state, a resistance value of the second electrode has a fourth change rate between the bent state and the expanded state, the fourth change rate is larger than the third change rate, and both the third change rate and the fourth change rate are less than 10%.

7. The electrode structure according to claim 1, wherein the sensing electrode comprises a first electrode and a second electrode, the first electrode and the second electrode are disposed on different sides of the substrate, the second electrode is closer to a bending axis than the first electrode, a resistance value of the first electrode has a third change rate between the bent state with a bending radius of about 3 mm and the expanded state, a resistance value of the second electrode has a fourth change rate between the bent state with a bending radius of about 3 mm and the expanded state, the fourth change rate is about 1.1-2.5 times or 1.2-1.8 times the third change rate, and both the third change rate and the fourth change rate are less than 10%.

8. The electrode structure according to claim 1, wherein the sensing electrode comprises a sheet resistance of 15-100 ops.

9. The electrode structure according to claim 1, wherein the sensing electrode comprises a sheet resistance of 30-70 ops.

10. The electrode structure according to claim 1, wherein the substrate has a thickness of about 25-125 µm.

11. The electrode structure according to claim 1, wherein the sensing electrode comprises Ag or Cu.

12. A device comprising the electrode structure according to claim 1, wherein the device is a flexible display device comprising a display element, an optical adhesive layer is disposed between the display element and the electrode structure, and the display element displays an image correspondingly to the bending region, the first non-bending region, and the second non-bending region.

13. The device according to claim 12, wherein an average slope of a storage modulus of the optical adhesive layer ranges from −4.0 kPa/° C. to −1.5 kPa/° C. in a temperature range of −30° C. to 60° C.

14. An electrode structure, comprising:
a substrate; and
a sensing electrode disposed on the substrate;
wherein the electrode structure is changed from an expanded state to a bent state with a bending radius of about 2-4 mm, the electrode structure comprises a bending region and a first non-bending region and a second non-bending region respectively adjacent to the bending region in the bent state, and a resistance value of an electrode section of the sensing electrode in the bending region has a first change rate between the bent state and the expanded state of less than 10%;
wherein the sensing electrode comprises a first end in the first non-bending region and a second end in the second non-bending region, and a resistance value of a section between the first end and the second end of the sensing electrode has a second change rate between the bent state and the expanded state of about 1-5%;
wherein the sensing electrode comprises a sheet resistance of 15-100 ops.

15. The electrode structure according to claim 14, wherein the sensing electrode comprises silver nanowires, metal oxides, or metal mesh.

16. The electrode structure according to claim 14, wherein the electrode structure is changed from the expanded state to the bent state with the bending radius of about 3 mm, and the first change rate between the bent state and the expanded state of the sensing electrode is about 2.8%-7.2%; or, the electrode structure is changed from the expanded state to the bent state with the bending radius of about 2-4 mm, and the first change rate between the bent state and the expanded state of the sensing electrode is about 2.4%-7.2%.

17. The electrode structure according to claim 14, wherein the sensing electrode comprises a first electrode and a second electrode.

18. The electrode structure according to claim 14, wherein the substrate has a thickness of about 25-125 µm.

19. The electrode structure according to claim 14, wherein the sensing electrode comprises Ag or Cu.

20. An electrode structure, comprising:
a substrate; and
a sensing electrode disposed on the substrate;
wherein the electrode structure is changed from an expanded state to a bent state with a bending radius of about 2-4 mm, the electrode structure comprises a bending region and a first non-bending region and a second non-bending region respectively adjacent to the bending region in the bent state, and a resistance value of an electrode section of the sensing electrode in the bending region has a first change rate between the bent state and the expanded state of less than 10%;
wherein the sensing electrode comprises a first end in the first non-bending region and a second end in the second non-bending region, and a resistance value of a section between the first end and the second end of the sensing electrode has a second change rate between the bent state and the expanded state of about 1-5%;
wherein the sensing electrode comprises a first electrode and a second electrode, the first electrode and the second electrode are disposed on different sides of the substrate, the second electrode is closer to a bending axis than the first electrode, a resistance value of the first electrode has a third change rate between the bent state with a bending radius of about 3 mm and the expanded state, a resistance value of the second electrode has a fourth change rate between the bent state with a bending radius of about 3 mm and the expanded state, the fourth change rate is about 1.1-2.5 times or 1.2-1.8 times the third change rate, and both the third change rate and the fourth change rate are less than 10%.

* * * * *